United States Patent
Fransen

(10) Patent No.: US 6,568,352 B2
(45) Date of Patent: May 27, 2003

(54) DEVICE FOR COOLING A DAIRY ANIMAL, SUCH AS A COW

(75) Inventor: Renatus Ignatius Josephus Fransen, Vlaardingen (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/153,203

(22) Filed: May 23, 2002

(65) Prior Publication Data

US 2002/0174837 A1 Nov. 28, 2002

(30) Foreign Application Priority Data

May 23, 2001 (NL) ............................................. 1018146

(51) Int. Cl.[7] ............................. A01K 29/00; A01J 3/00
(52) U.S. Cl. ..................... 119/668; 119/665; 119/14.08
(58) Field of Search ................................. 119/665, 666, 119/667, 668, 669, 14.08, 14.09

(56) References Cited

U.S. PATENT DOCUMENTS

| | | | | |
|---|---|---|---|---|
| 3,246,631 A | * | 4/1966 | Holm | 119/669 |
| 4,443,387 A | * | 4/1984 | Gordon | 119/668 |
| 4,476,809 A | * | 10/1984 | Bunger | 119/668 |
| 4,693,852 A | * | 9/1987 | Gordon | 119/668 |
| 5,738,044 A | * | 4/1998 | Gaylinn | 119/669 |
| 6,401,664 B1 | * | 6/2002 | Kampmann | 119/668 |

* cited by examiner

*Primary Examiner*—Charles T. Jordan
*Assistant Examiner*—Elizabeth Shaw
(74) *Attorney, Agent, or Firm*—Penrose Lucas Albright

(57) ABSTRACT

A device for cooling a dairy animal, such as a cow. Said device is provided with wetting means for applying liquid to at least a part of the dairy animal and with air displacing means for generating an air flow along the wetted part. The device comprises a wetting area, said wetting area exclusively comprising the wetting means and not the air displacing means. The device comprises a ventilation area located at some distance from the wetting area, the ventilation area comprising the air displacing means. The device is provided with a path for the dairy animal, said path connecting the wetting area with the ventilation area.

12 Claims, 2 Drawing Sheets

DEVICE FOR COOLING A DAIRY ANIMAL, SUCH AS A COW

The invention relates to a device for cooling a dairy animal, such as a cow, according to the preamble of claim 1.

Such a device is known from NL 1012809. In this known device cooling takes place in the milking parlour by wetting with liquid and by air displacement. Due to this, the animal is less quickly inclined to leave the milking parlour and consequently makes it impossible for other animals to enter the milking parlour.

The invention aims inter alia at providing a device for cooling a dairy animal, in which the problem of obstruction is at least almost obviated.

According to the invention this is achieved in that a device for cooling a dairy animal of the above-described type comprises the measures of the characterizing part of claim 1. Because of the fact that there is made a distinction between the first treatment area where exclusively the wetting means and not the air displacing means are disposed, and the second treatment area that comprises the air displacing means, an animal is more quickly inclined to leave the first treatment area in order to experience additional cooling by the air displacing means. This will result in a reduction of the time during which the first treatment area will be occupied.

A device according to the invention is preferably provided with a milking parlour for milking a dairy animal, with a pre-treatment area for pre-treating the dairy animal prior to milking, and with a post-treatment area for post-treating a dairy animal after milking. In particular the first treatment area is constituted by the pre-treatment area and the second treatment area is constituted by the milking parlour. Alternatively the first treatment area is constituted by the pre-treatment area and the second treatment area is constituted by the post-treatment area. Alternatively the first treatment area is constituted by the milking parlour and the second treatment area is constituted by the post-treatment area.

Although it would be possible for the second treatment area also to comprise wetting means, it has appeared in practice that a dairy animal leaves the first treatment area so quickly that upon reaching the second treatment area it is still sufficiently wet, so that wetting means in the second treatment area are superfluous. Thus an embodiment of a device according to the invention is characterized in that the second treatment area exclusively comprises the air displacing means.

When the first treatment area comprises a first animal identification device and the second treatment area comprises a second animal identification device, it is possible to control the air displacing means with the aid of data from the first and second animal identification device. Thus it is possible for example to reward an animal that has been milked by cooling via the air displacing means, whereas a dairy animal that has visited the milking parlour but has not been milked is recognised as such and, consequently, is not rewarded by activation of the air displacing means.

When the air displacing means are activated during a pre-set time, a certain degree of cooling can be obtained, possibly in dependence of the environmental conditions.

In order to give or refuse animals access to the second treatment area, the second treatment area comprises an entrance gate controlled with the aid of data from the first and second animal identification device. In this manner undesired occupation of the second treatment area by a dairy animal is prevented.

The second treatment area is preferably provided with a device for supplying roughage for the purpose of improving the enticement of the dairy animal from the first treatment area.

The invention will now be explained in further detail with reference to the accompanying figures in which.

The invention will be elucidated hereinafter with reference to an embodiment in which the milking parlour constitutes the first treatment area, also called wetting area, and the post-treatment area, hereinafter called ventilation area, constitutes the second treatment area. However, it will be obvious that according to the invention the first treatment area may also be constituted by a pre-treatment area and the second treatment area may also be constituted by the milking parlour or the post-treatment area.

Figure 1:
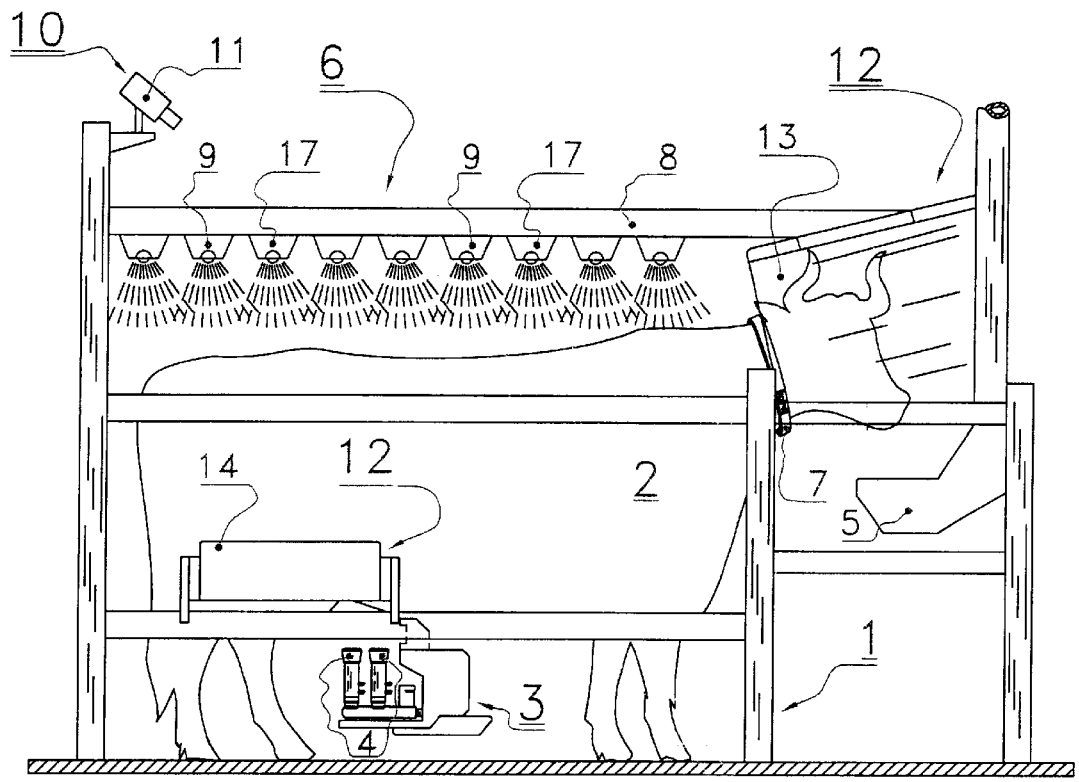
FIG. 1 is a schematic side view of a first embodiment of a milking parlour to be used in a device according to the invention.

FIG. 1 is a side view of a milking parlour in the form of a milking box 1 with a cow 2 present therein. The milking box 1 is provided with a milking robot 3 with teat cups 4 which are automatically connected to the teats of the cow 2 by means of the milking robot 3. Near the front side of the milking box 1 there is further disposed a feeding trough 5 to which concentrate can be supplied in metered portions, e.g. in dependence of the information obtained from a first animal identification device 7.

The milking box 1 is further provided with wetting means 6 with the aid of which at least the back of the cow 2 can be wetted. The wetting means 6 comprise e.g. a sprayer beam 8 with spraying nozzles 9 by means of which it is possible to atomise a liquid. In this manner the back of the cow 2 is cooled. During wetting the cow 2 it is possible to check with the aid of the detection means 10 whether or not formation of droplets occurs. For that purpose the detection means 10 comprise a camera 11.

To prevent certain parts of the cow 2 from coming into contact with the liquid in an undesired manner, the milking box 1 is further provided with shielding means 12. In the present embodiment the shielding means 12 comprise a transparent shielding cap 13 covering the head of the cow 2 during the wetting. As a result thereof the feeding trough 5 is also shielded against undesired wetting. The shielding means 12 may further comprise a second shielding cap 14 by means of which the udder of the cow 2 can be shielded. The second shielding cap 14 is pivotably fitted to the milking box 1.

Figure 2:
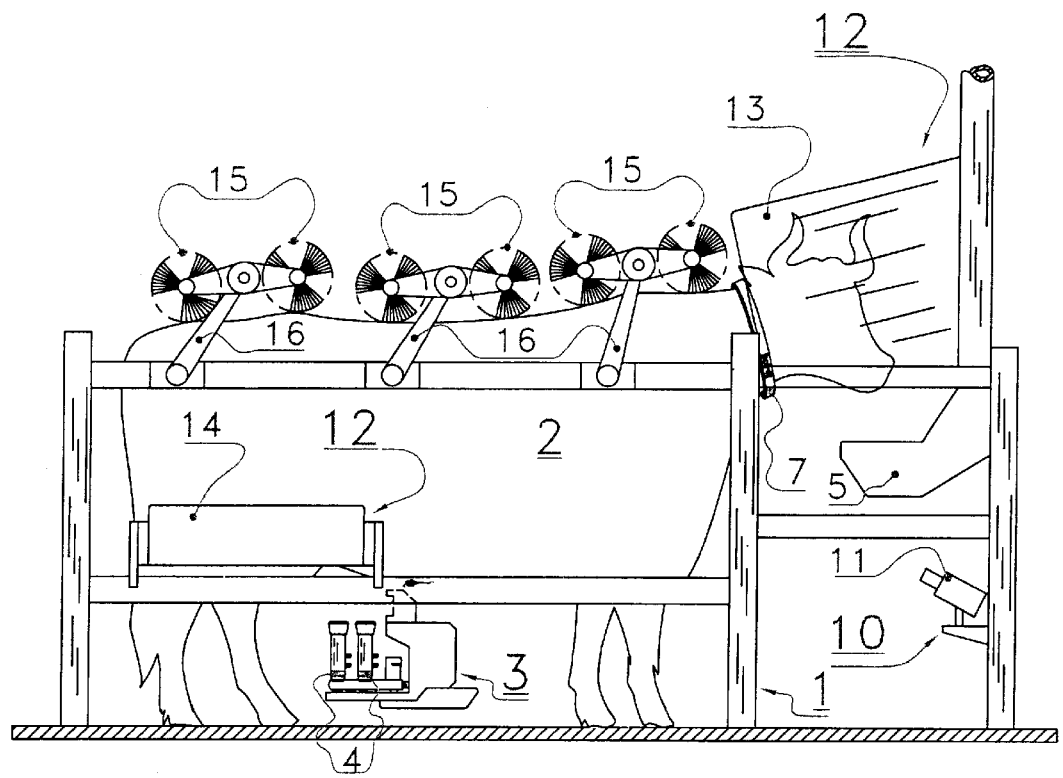
FIG. 2 is a schematic view of a second embodiment of a milking parlour to be used in a device according to the invention.
Figure 3:
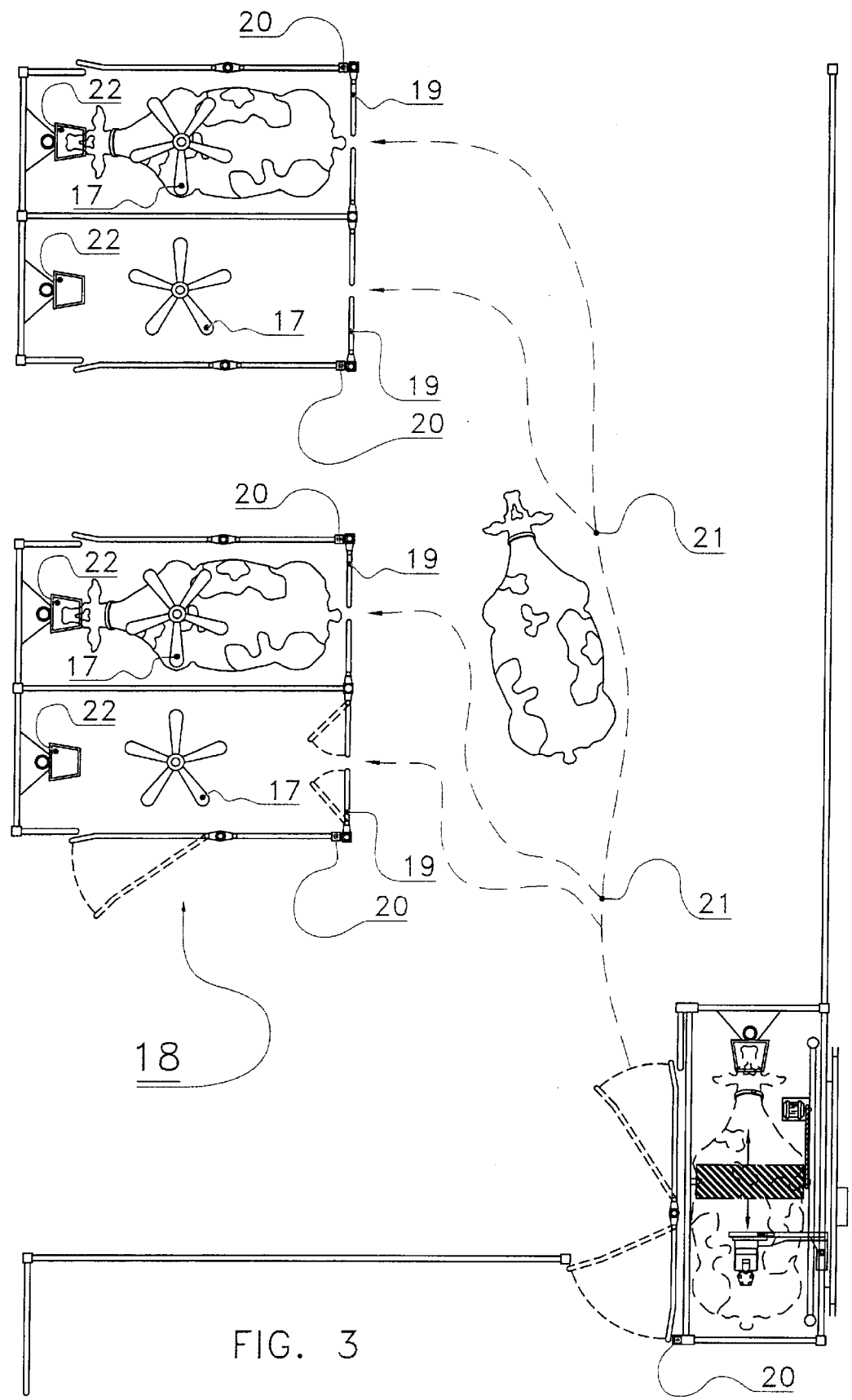
FIG. 3 is a schematic plan view of a device according to the invention.

FIG. 2 shows a second embodiment in which parts that are comparable with those of the first embodiment are designated by the same reference numerals. In the second embodiment the wetting means 6 comprise motor-drivable brushes 15 provided with (non-shown) liquid supply means with the aid of which liquid can be supplied to the brushes during brushing. By means of the brushes 15 the liquid is thus applied between the hairs of the cow 2. The motor-drivable brushes 15 are disposed on a pivotable arm 16 that is connected with the milking box 1.

In the two above-described embodiments the milking box 1 exclusively comprises wetting means (and of course elements that are relevant to milking and feeding and the like), but no air displacing means with the aid of which air is passed along the wetted surface of the cow 2 after or during brushing.

Such air displacing means 17 are disposed in a ventilation area 18 (composed of one or more ventilation boxes) which is located at some distance from the milking parlour 1 and which can be reached by the cow 2 or another dairy animal via a path 21 connecting the milking parlour 1 with the ventilation area 18. The ventilation area 18 may optionally comprise wetting means.

The ventilation area 18 comprises a second animal identification device 20. This second animal identification device 20 is adapted to control the air displacing means 17 (e.g. ventilators) together with the first animal identification device 7, so that a dairy animal can be cooled if desired. In dependence of what is desired and/or the temperature to be reached and/or the environmental conditions the air displacing means 17 can be activated during a pre-set time.

The ventilation area 18 may comprise an entrance gate 19 which is controlled with the aid of data from the first and second animal identification device 7, 20 to give access to the ventilation boxes in a proper manner.

For the purpose of reinforcing the enticement of the dairy animal 2 from the milking box 1, the ventilation area 18 is provided with a device 22 for supplying roughage. In order to stimulate a dairy animal 2 to leave the ventilation area 18, e.g. for making room for a next dairy animal coming from the milking box 1, the air displacing means 17 may be deactivated and/or the device 22 for supplying roughage may be closed.

What is claimed is:

1. A device for cooling a dairy animal, such as a cow, said device being provided with wetting means for applying liquid to at least a part of the dairy animal, and with air displacing means for generating an air flow along the wetted part, characterized in that the device comprises a first treatment area and a second treatment area for the dairy animal, the second treatment area being located at some distance from the first treatment area and the wetting means being exclusively disposed in the first treatment area, in that the second treatment area comprises the air displacing means, and in that the device is provided with a path for the dairy animal, said path connecting the first treatment area with the second treatment area.

2. A device as claimed in claim 1, characterized in that the device is provided with a milking parlour for milking a dairy animal, with a pre-treatment area for pre-treating the dairy animal prior to milking and with a post-treatment area for post-treating a dairy animal after milking.

3. A device as claimed in claim 2, characterized in that the first treatment area is constituted by the pre-treatment area and in that the second treatment area is constituted by the milking parlour.

4. A device as claimed in claim 2, characterized in that the first treatment area is constituted by the pre-treatment area and in that the second treatment area is constituted by the post-treatment area.

5. A device as claimed in claim 2, characterized in that the first treatment area is constituted by the milking parlour and in that the second treatment area is constituted by the post-treatment area.

6. A device as claimed in claim 2, characterized in that the first treatment area comprises a first animal identification device.

7. A device as claimed in claim 6 characterized in that the air displacing means are controlled with the aid of data from the first and second animal identification device.

8. A device as claimed in claim 6 characterized in that the second treatment area comprises an entrance gate controlled with the aid of data from the first and second animal identification device.

9. A device as claimed in claim 1 characterized in that the second treatment area exclusively comprises the air displacing means.

10. A device as claimed in claim 1 characterized in that the second treatment area comprises a second animal identification device.

11. A device as claimed in claim 1 characterized in that the air displacing means are activated during a pre-set time.

12. A device as claimed in claim 1 characterized in that the second treatment area is provided with a device for supplying roughage.

* * * * *